United States Patent
Kim et al.

(10) Patent No.: US 10,567,782 B2
(45) Date of Patent: *Feb. 18, 2020

(54) METHOD FOR ENCODING/DECODING BLOCK INFORMATION USING QUAD TREE, AND DEVICE FOR USING SAME

(71) Applicants: Electronics and Telecommunications Research Institute, Daejeon (KR); KOREA ADVANCED INSTITUTE OF SCIENCE AND TECHNOLOGY, Daejeon (KR)

(72) Inventors: Jong Ho Kim, Daejeon (KR); Hui Yong Kim, Daejeon (KR); Se Yoon Jeong, Daejeon (KR); Sung Chang Lim, Daejeon (KR); Ha Hyun Lee, Seoul (KR); Jin Ho Lee, Daejeon (KR); Suk Hee Cho, Daejeon (KR); Jin Soo Choi, Daejeon (KR); Jin Woong Kim, Daejeon (KR); Chie Teuk Ahn, Daejeon (KR); Mun Churl Kim, Daejeon (KR); Bum Shik Lee, Daejeon (KR)

(73) Assignees: Electronics and Telecommunications Research Institute, Daejeon (KR); Korea Advanced Institute of Science and Technology, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,250

(22) Filed: Sep. 18, 2018

(65) Prior Publication Data

US 2019/0020887 A1 Jan. 17, 2019

Related U.S. Application Data

(63) Continuation of application No. 15/824,155, filed on Nov. 28, 2017, now Pat. No. 10,110,912, which is a
(Continued)

(30) Foreign Application Priority Data

Oct. 4, 2010 (KR) .................. 10-2010-0096559
Dec. 21, 2010 (KR) .................. 10-2010-0131794
(Continued)

(51) Int. Cl.
*H04N 19/70* (2014.01)
*H04N 19/593* (2014.01)
(Continued)

(52) U.S. Cl.
CPC ............ *H04N 19/44* (2014.11); *H04N 19/18* (2014.11); *H04N 19/46* (2014.11);
(Continued)

(58) Field of Classification Search
CPC .................................................... H04N 19/44
See application file for complete search history.

(56) References Cited

U.S. PATENT DOCUMENTS 6,330,280 B1 * 12/2001 Suzuki ................ H04N 19/563
375/240.08
6,546,143 B1 * 4/2003 Taubman ............. H04N 19/423
375/240.19
(Continued)

FOREIGN PATENT DOCUMENTS

CN 1681330 A 10/2005
CN 101656880 A 2/2010
(Continued)

OTHER PUBLICATIONS

T. Wiegand, et al., "BoG report: residual quadtree structure", *Joint Collaborative Team on Video Coding (JCT-VC) of ITU-T SG16 WP3 and ISO/IEC JTC1/SC29/WG11*, 3rd Meeting, Guangzhou, CN, Oct. 7, 2010, pp. 1-17.
(Continued)

*Primary Examiner* — Irfan Habib
(74) *Attorney, Agent, or Firm* — NSIP Law

(57) ABSTRACT

Disclosed decoding method of the intra prediction mode comprises the steps of: determining whether an intra pre-
(Continued)

diction mode of a present prediction unit is the same as a first candidate intra prediction mode or as a second candidate intra prediction mode on the basis of 1-bit information; and determining, among said first candidate intra prediction mode and said second candidate intra prediction mode, which candidate intra prediction mode is the same as the intra prediction mode of said present prediction unit on the basis of additional 1-bit information, if the intra prediction mode of the present prediction unit is the same as at least either the first candidate intra prediction mode or the second candidate intra prediction mode, and decoding the intra prediction mode of the present prediction unit.

19 Claims, 12 Drawing Sheets

Related U.S. Application Data continuation of application No. 15/363,869, filed on Nov. 29, 2016, now Pat. No. 9,860,546, which is a continuation of application No. 13/877,503, filed as application No. PCT/KR2011/007326 on Oct. 4, 2011, now Pat. No. 9,544,595.

(30)  Foreign Application Priority Data

May 24, 2011  (KR) .................. 10-2011-0049257
Oct. 4, 2011  (KR) .................. 10-2011-0100675

(51) Int. Cl.
  H04N 19/44   (2014.01)
  H04N 19/46   (2014.01)
  H04N 19/60   (2014.01)
  H04N 19/18   (2014.01)
  H04N 19/64   (2014.01)

(52) U.S. Cl.
  CPC .......... *H04N 19/593* (2014.11); *H04N 19/60* (2014.11); *H04N 19/64* (2014.11); *H04N 19/70* (2014.11)

(56)  References Cited

U.S. PATENT DOCUMENTS

| | | | | |
|---|---|---|---|---|
| 6,915,015 B1* | 7/2005 | Taubman | ............... | H04N 19/63 375/240.19 |
| 8,463,061 B2* | 6/2013 | Takada | ............... | G06T 9/007 375/240.11 |
| 8,634,456 B2 | 1/2014 | Chen et al. | | |
| 8,798,159 B2* | 8/2014 | Han | ............... | H04N 19/44 375/240.24 |
| 9,053,549 B2 | 6/2015 | Kondo | | |
| 9,191,670 B2* | 11/2015 | Karczewicz | ............... | H04N 19/70 |
| 9,544,595 B2 | 1/2017 | Kim et al. | | |
| 9,729,884 B2 | 8/2017 | Lim et al. | | |
| 9,860,546 B2 | 1/2018 | Kim et al. | | |
| 9,979,982 B2 | 5/2018 | Kondo | | |
| 10,110,912 B2* | 10/2018 | Kim | ............... | H04N 19/44 |
| 2003/0156640 A1* | 8/2003 | Sullivan | ............ | H04N 21/8455 375/240.01 |
| 2004/0234144 A1* | 11/2004 | Sugimoto | ............ | H04N 19/176 382/239 |
| 2005/0135691 A1* | 6/2005 | Reese | ............... | H03M 7/42 382/246 |
| 2005/0238102 A1* | 10/2005 | Lee | ............... | H04N 5/145 375/240.16 |
| 2006/0215759 A1* | 9/2006 | Mori | ............... | H04N 5/147 375/240.16 |
| 2006/0227881 A1* | 10/2006 | Gordon | ............... | H04N 19/46 375/240.25 |
| 2007/0019872 A1* | 1/2007 | Birinov | ............... | H04N 19/159 382/236 |
| 2007/0160302 A1* | 7/2007 | Han | ............... | H04N 19/176 382/240 |
| 2008/0219578 A1* | 9/2008 | Lee | ............... | H03M 7/4006 382/247 |
| 2009/0232204 A1* | 9/2009 | Lee | ............... | H04N 19/176 375/240.02 |
| 2009/0262835 A1* | 10/2009 | Srinivasan | ............ | H04N 19/105 375/240.16 |
| 2010/0027680 A1* | 2/2010 | Segall | ............... | H04N 19/119 375/240.24 |
| 2010/0207941 A1 | 8/2010 | Lee et al. | | |
| 2010/0322317 A1* | 12/2010 | Yoshimatsu | ............ | H04N 19/70 375/240.24 |
| 2011/0026600 A1* | 2/2011 | Kenji | ............... | H04N 19/70 375/240.24 |
| 2011/0038412 A1* | 2/2011 | Jung | ............... | H04N 19/122 375/240.12 |
| 2011/0038554 A1* | 2/2011 | Lee | ............... | H04N 19/169 382/233 |
| 2011/0122948 A1* | 5/2011 | Sagata | ............... | H04N 19/176 375/240.13 |
| 2011/0274162 A1* | 11/2011 | Zhou | ............... | H04N 19/176 375/240.03 |
| 2012/0195379 A1* | 8/2012 | Alshin | ............... | H04N 19/105 375/240.12 |
| 2012/0287993 A1* | 11/2012 | Priddle | ............... | H04N 19/174 375/240.12 |
| 2013/0156099 A1* | 6/2013 | Sasai | ............... | H04N 19/176 375/240.03 |
| 2013/0188731 A1 | 7/2013 | Kim et al. | | |
| 2013/0188735 A1* | 7/2013 | Nguyen | ............... | H04N 19/176 375/240.25 |
| 2018/0084266 A1 | 3/2018 | Kim et al. | | |

FOREIGN PATENT DOCUMENTS

| | | | |
|---|---|---|---|
| JP | 2002-359859 A | | 12/2002 |
| JP | 5612215 B2 | | 10/2014 |
| KR | 1998-035968 A | | 8/1998 |
| KR | 0167367 B1 | | 3/1999 |
| KR | 10-0202495 B1 | | 6/1999 |
| KR | 10-0210399 B1 | | 7/1999 |
| KR | 10-0212330 B1 | | 8/1999 |
| KR | 10-2007-0075227 A | | 7/2007 |
| KR | 10-2010-0030671 A | | 3/2010 |
| KR | 10-2011-0010324 A | | 2/2011 |
| KR | 10-2011-0017721 A | | 2/2011 |
| KR | 10-1356439 B1 | | 2/2014 |
| KR | 10-1446286 B1 | | 10/2014 |
| KR | 10-1446287 B1 | | 10/2014 |
| KR | 10-1461495 B1 | | 11/2014 |
| KR | 10-1835835 B1 | | 3/2018 |
| WO | WO 9222166 A1 | | 12/1992 |

OTHER PUBLICATIONS

B. Lee, et al., "Improved side information signaling for quad-tree based transform structure of TMuC," *Joint Collaborative Team on Video Coding (JCT-VC) of ITU-T SG16 WP3 and ISO/IEC JTC1/SC29/WG11*, 3rd Meeting, Guangzhou, CN, Oct. 11, 2010, pp. 1-5.

B. Li, et al., "A unified design of ROT cbf coding in LCEC," *Joint Collaborative Team on Video Coding (JCT-VC) of ITU-T SG16 WP3 and ISO/IEC JTC1/SC29/WG11*, 4th Meeting, Daegu, KR, Jan. 20-28, 2011, pp. 1-4.

International Search Report dated Apr. 10, 2012, in counterpart International Application No. PCT/KR2011/007326 (3 pages, in Korean).

Japanese Office Action dated Jan. 7, 2014, in counterpart Japanese Application No. 2013-531507 (2 pages, in Japanese).

Korean Notice of Allowance dated Jan. 29, 2014, in counterpart Korean Application No. 10-2013-0083726 (6 pages, in Korean).

(56) References Cited

OTHER PUBLICATIONS

Extended European Search Report dated May 8, 2014, in counterpart European Application No. 11830881.6 (7 pages, in English).
Korean Office Action dated Jul. 4, 2014, in counterpart Korean Application No. 10-2014-0054379 (5 pages, in Korean).
Korean Notice of Allowance dated Oct. 16, 2014, in counterpart Korean Application No. 10-2014-0054379 (6 pages, in Korean).
Office Action dated Sep. 25, 2015, in the corresponding Chinese Application No. 201180058404.0.
Li, Bin et al., "Redundancy reduction in Cbf and Merge coding," *Joint Collaborative Team on Video coding (JCT-VC) of ITU-T SG16 WP3 and ISO/IEC JTC1/SC29/WG11*, 3rd Meeting, Guangzhou, China, Oct. 7-15, 2010 (8 pages in English).
Petition for Inter Partes Review of parent U.S. Pat. No. 9,544,595 filed on May 29, 2019 (88 pages, in English).
Declaration of Dr. Michael Orchard executed on May 8, 2019 and filed with Petition for Inter Partes Review of U.S. Pat. No. 9,544,595 on May 29, 2019 (97 pages, in English).
File history of parent U.S. Pat. No. 9,544,595 retrieved Jun. 10, 2019 (847 pages, in English).
Joint Collaborative Team on Video Coding (JCT-VC). "Test Model Under Consideration". JCTVC-A205, Dresden, DE, Apr. 15-23, 2010. (112 pages, in English).
Joint Collaborative Team on Video Coding (JCT-VC). "Test Model Under Consideration". JCTVC-B205, Geneva, CH, Jul 21-28, 2010. (153 pages, in English).
Declaration of Mr. Kenneth David McCann executed on May 9, 2019 and filed with Petition for Inter Partes Review of U.S. Pat. No. 9,544,595 on May 29, 2019 (30 pages, in English).
Richardson, Iain E. *H. 264 and MPEG-4 video compression: video coding for next-generation multimedia*. John Wiley & Sons, 2004. (295 pages, in English).
Petitioner's Voluntary Interrogatory Responses filed with Petition for Inter Partes Review of parent U.S. Pat. No. 9,544,595 on May 29, 2019 (10 pages, in English).
ITU-T H.264. "Series H: Audiovisual and Multimedia Systems: Infrastructure of Audiovisual Services—Coding of Moving Video." ITU-T Telecommunication Standardization Sector of ITU, "Advanced Video Coding for Generic Audiovisual Services" (Feb. 2014). (790 pages, in English).
ITU-T H.262. "Transmission of Non-Telephone Signals." *ITU-T Telecommunication Standardization Sector of ITU, "Information Technology—Generic Coding of Moving Pictures and Associated Audio Information: Video*" (Jul. 1995). (211 pages, in English).
"Terms of Reference of the Joint Collaborative Team on Video Coding Standard Development." Kyoto (Jan. 2010). (4 pages, in English).
McCann, Ken, et al. "JCT-VC AHG Report: Test Model under Consideration (TMuC) editing", Guangzhou, CN, Oct. 7-15, 2010. Document JCTVC-C002 (2010). (3 pages, in English).
Sullivan, Gary J., et al. "Meeting Report of the First Meeting of the Joint Collaborative Team on Video Coding (JCT-VC)." Dresden, DE (2010): 15-23. (57 pages, in English).
List of JCT-VC Meetings Page dated Apr. 24, 2019 (1 page, English).
Sullivan, Gary J., et al. "Meeting Report of the Second Meeting of the Joint Collaborative Team on Video Coding (JCT-VC)." *document JCTVC-B200 of JCT-VC*, Geneva, CH, (Jul. 21-28, 2010). (72 pages, in English).
Sullivan, Gary J., et al. "Meeting Report of the Third Meeting of the Joint Collaborative Team on Video Coding (JCT-VC)." *document JCTVC-C400 of JCT-VC*, Guanzhou, CN, (Oct. 7-15, 2010). (156 pages, in English).
"[e.g., Input Document to JCT-VC or Output Document Approved by JCT-VC]." *Template document JCTV-Axxx. Dresden, DE* (Apr. 15-23, 2010). (2 pages, in English).
"[e.g., Input Document to JCT-VC or Output Document Approved by JCT-VC]." *Template document JCTV-Bxxx. Geneva, CH* (Jul. 21-28, 2010). (2 pages, in English).
Email from Ken McCann, "RE: JCTVC-A125 uploaded", dated Apr. 11, 2010 (1 pages, in English).
Email from Gary Sullivan, "RE: [mpeg-newvid] Document registrations for the upcoming JCT-VC meeting in Dresden", dated Apr. 11, 2010 (2 pages, in English).
1st Meeting Document Register, Documents of the first meeting of the Joint Collaborative Team of Video Coding (JCT-VC) Dresden, Germany, Apr. 15-23, 2010 (dated May 8, 2019) (6 pages, in English).
Joint Collaborative Team on Video Coding (JCT-VC). "AHG Report—Test Model under Consideration (TMuC) editing". JCTVC-B002, Geneva, CH, Jul. 21-28, 2010. (3 pages, in English).
Email from Ken McCann, "[AHG TMuC Editing] Launch of TMuC Editing AhG", dated May 8, 2010 (59 pages, in English).
Email from Ken McCann, "RE: RE: RE: TMuC specification (A205) draft 002", dated May 24, 2010 (4 pages, in English).
Email from Ken McCann, "RE: [jct-vc] [AHG TMuC Editing] Launch of TMuC Editing AhG", dated May 24, 2010 (115 pages, in English).
Email from Library & Archives Services, ITU, "RE: Request for information", dated May 7, 2019 (4 pages, in English).
Email from Ken McCann, "RE: [jct-vc] [AHG TMuC Editing] Editing JCTVC-A205", dated May 24, 2010 (2 pages, in English).
Email from Gary Sullivan, "RE: [jct-vc] [AHG TMuC Editing] Editing JCTVC-A205", dated May 24, 2010 (2 pages, in English).
Documents of the first meeting of the Joint Collaborative Team of Video Coding (JCT-VC) Dresden, Germany, Apr. 15-23, 2010 (dated May 8, 2019) (23 pages, in English).
IBC 2018 Infographic (8 pages, in English).
Ohm, Jens-Rainer, et al. "Towards Standardization of High Efficiency Video Coding" (8 pages, in English).
Patent Owners' Preliminary Response to Petition for Inter Partes Review of parent U.S. Pat. No. 9,544,595 filed on May 29, 2019 (81 pages, in English).
Lee et al., *Improved side information signaling for quad-tree based transform structure of TMuC*, Joint Collaborative Team on Video Coding (JCT-VC) of ITU-T SG16 WP3 and ISO/IEC JTC1/SC29/WG11, 3rd Meeting: Guangzhou, CN (Oct. 7-15, 2010), https://www.itu.int/wftp3/av-arch/jctvc-site/2010_10_C_Guangzhou/JCTVC-C068_r1.zip (5 pages, in English).
Bross et al., *WD4: Working Draft 4 of High-Efficiency Video Coding*, Joint Collaborative Team on Video Coding (JCT-VC) of ITU-T SG16 WP3 and ISO/IEC JTC1/SC29/WG11, 6th Meeting: Torino, IT (Jul. 14-22, 2011) (226 pages, in English).
JCT-VC Website, Directory (Sep. 29, 2010), https://web.archive.org/web/20100929091121/http://wftp3.itu.int/av-arch/jctvc-site (1 pages, in English).
JCT-VC Website, Dresden Page (Sep. 29, 2010), https://web.archive.org/web/20100929091108/http://wftp3.itu.int/av-arch/jctvc-site/2010_04_A_Dresden/ (6 pages, in English).
JCT-VC Website, Geneva Page (Sep. 15, 2010), https://web.archive.org/web/20100915110620/http://wftp3.itu.int/av-arch/jctvc-site/2010_07_B_Geneva/ (4 pages, in English).
JCTVC-A205.zip file, (Aug. 7, 2012) https://web.archive.org/web/20100829194430/http://wftp3.itu.int/av-arch/jctvc-site/JCTVC-A205.zip (1 page, in English).
JCTVC_A205-002 (last modified May 24, 2010), https://www.itu.int/wftp3/av-arch/jctvc-site/2010_04_A_Dresden/JCTVC-A205.zip (114 pages, in English).

\* cited by examiner

FIG. 10

METHOD FOR ENCODING/DECODING BLOCK INFORMATION USING QUAD TREE, AND DEVICE FOR USING SAME

CROSS REFERENCE TO RELATED APPLICATION(S)

This application is a Continuation of U.S. application Ser. No. 15/824,155, filed on Nov. 28, 2017, now U.S. Pat. No. 10,110,912, issued Oct. 23, 2018, which is a Continuation of U.S. application Ser. No. 15/363,869, filed on Nov. 29, 2016, now U.S. Pat. No. 9,860,546, issued Jan. 2, 2018, which is a Continuation of U.S. application Ser. No. 13/877,503, filed on Apr. 3, 2013, now U.S. Pat. No. 9,544,595, issued on Jan. 10, 2017, which is a National Phase entry of PCT Application No. PCT/KR2011/007326, filed on Oct. 4, 2011, which claims priority under 35 U.S. C. § 119(c) and 365(c) to Korean Patent Application No. 10-2010-0096559, filed on Oct. 4, 2010, Korean Patent Application No. 10-2010-0131794, filed on Dec. 21, 2010, Korean Patent Application No. 10-2011-0049257, filed on May 24, 2011, and Korean Patent Application No. 10-2011-0100675, filed on Oct. 4, 2011, the entire disclosures of each of which are incorporated herein by reference for all purposes.

TECHNICAL FIELD

The present invention relates to a block information encoding/decoding method using a quad tree and an apparatus using the same, and more particularly, to a video encoding/decoding method.

BACKGROUND ART

Recently, with the expansion of broadcasting services having high definition (HD) resolution in the country and around the world, many users have been accustomed to a high resolution and definition video, such that many organizations have conducted many attempts to develop next-generation video devices. In addition, the interest in HDTV and ultra high definition (UHD) having a resolution four times higher than that of HDTV have increased and thus, a compression technology for higher-resolution and higher-definition video have been required.

For the video compression, an inter prediction technology predicting pixel values included in a current picture from a picture before and/or after the current picture, an intra prediction technology predicting pixel values included in the current picture using pixel information in the current picture, an entropy encoding technology allocating a short code to symbols having a high appearance frequency and a long code to symbols having a low appearance frequency, or the like, may be used.

An example of the video compression technology may include a technology providing a predetermined network bandwidth under a limited operation environment of hardware, without considering a flexible network environment. However, in order to compress video data applied to the network environment in which the bandwidth is frequently changed, a new compression technology is required. To this end, a scalable video encoding/decoding method may be used.

DISCLOSURE

Technical Problem

The present invention provides a method for decoding transform unit information using a quad tree so as to increase video encoding efficiency.

The present invention also provides a method for decoding transform unit information using a quad tree and a joint encoding method so as to increase video encoding efficiency.

The present invention also provides an apparatus for decoding transform unit information using a quad tree so as to increase video encoding efficiency.

The present invention also provides an apparatus for decoding transform unit information using a quad tree and a joint encoding method so as to increase video encoding efficiency.

Technical Solution

In accordance with an illustrative configuration, there is provided a video decoding apparatus using a quad tree structure. The apparatus includes an entropy decoder decoding integrated code block flag information in an encoding unit, decoding a split information flag based on the integrated code block flag information and size information in a transform unit, decoding the code block flag information in the transform unit when the transform unit is not additionally split based on the split information flag, and decoding transform coefficients in the transform unit. The apparatus also includes an inverse transformer inversely the transform coefficient received from the entropy decoder. The entropy decoder does not decode the split information flag when the transform coefficients in the transform unit are not present.

In addition, the entropy decoder determines that the transform unit is not additionally split when the split information flag is 0, and decodes flag information indicating whether a Luma component in the transform unit includes one or more transform coefficients other than 0 into the code block flag information when the transform unit is not additionally split based on the split information flag.

The entropy decoder decodes the code block flag information in the transform unit without decoding the split information flag when the transform-unit size is the same as a least transform unit which is not split into an additional transform unit.

Also, the entropy decoder decodes the integrated code block flag in a most significant transform unit in which a transform depth in the transform unit is 0 and decodes the split information flag indicating whether the most significant transform unit is additionally split.

The integrated code block flag information is applied in only the predetermined transform depth in the transform unit.

The entropy decoder decodes the integrated code block flag when the transform depth is 0.

Advantageous Effects

As set forth above, the block information encoding/decoding method using the quad tree and the apparatus using the same according to the exemplary embodiments of the present invention can represent the transform coefficient information and the division possible information in the current transform unit by using the integrated code flag information and the division information flag. Therefore, the exemplary embodiments of the present invention can increase the encoding/decoding efficiency by encoding/decoding the transform coefficient information and the division possible information in the transform unit using the smaller bit.

DESCRIPTION OF DRAWINGS

FIG. 10 is a conceptual diagram showing a method for coupling and encoding an integrated code flag and a division information flag according to another exemplary embodiment of the present invention and integrating transform unit information in transform units present at the same depth.

MODE FOR INVENTION

Figure 1:
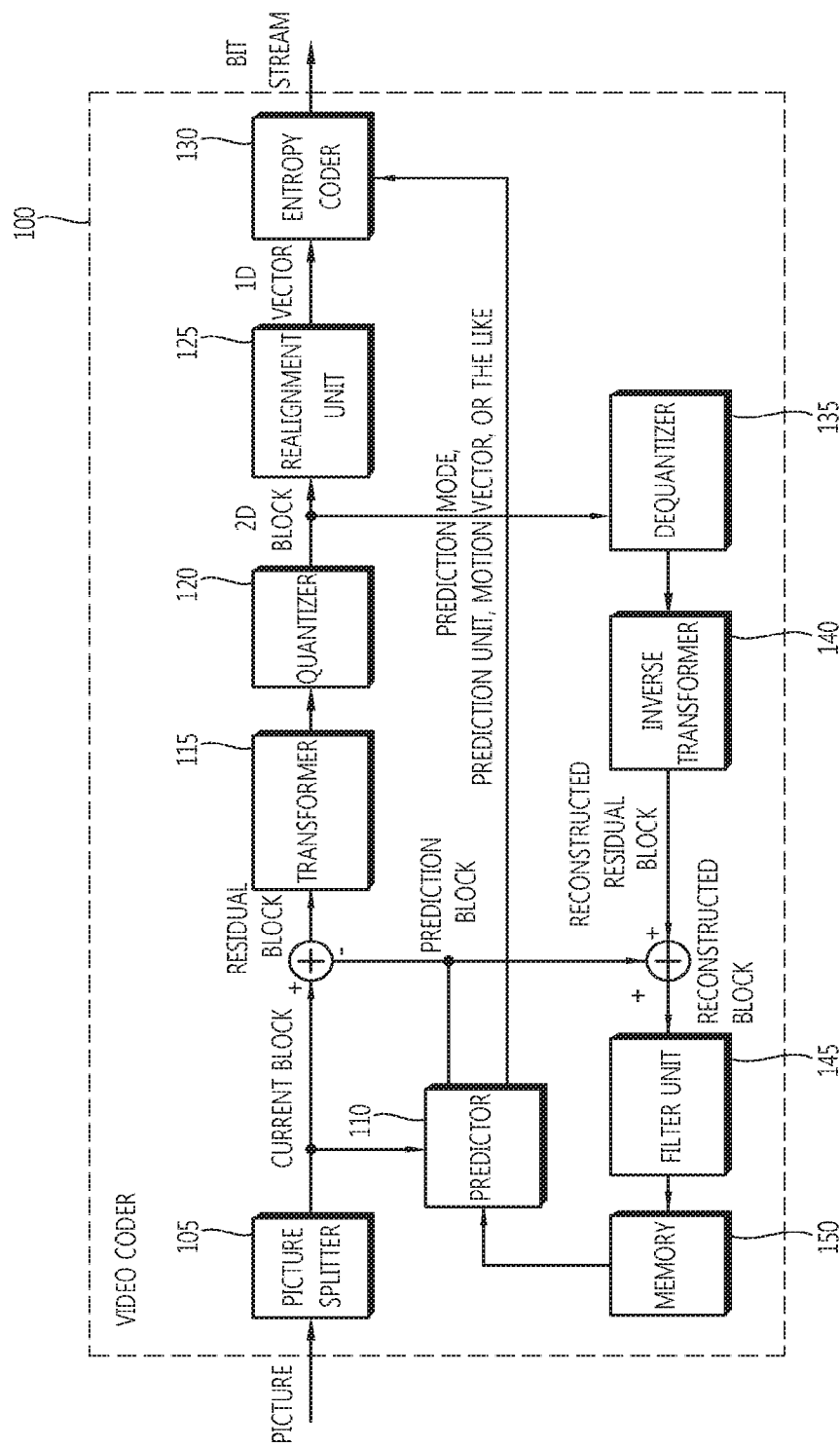
FIG. 1 is a block diagram showing a video encoding apparatus according to an exemplary embodiment of the present invention.

Although the present invention can be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

Further, terms used in the specification, 'first', 'second', etc. can be used to describe various components, but the components are not to be construed as being limited to the terms. The terms are only used to differentiate one component from other components. For example, the first component may be called the second component without departing from the scope of the present invention. Likewise, the second component may be called the first component. The term 'and/or' includes a combination of a plurality of items or any one of a plurality of terms.

In the case it is stated that any components are "connected" or "coupled" to other components, it is to be understood that the components may be directly connected or coupled to other components, but there is another component therebetween. On the other hand, in the case that it is stated that any components are "directly connected" or "directly coupled" to other components, it is to be understood that there is no another component therebetween.

The terms used in the specification are used to describe only specific embodiments and are not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof. Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in detail with reference to the accompanying drawings. In describing the present invention, like components are denoted by like reference numerals in order to help in an overall understanding of the present invention and descriptions of the same or like components will not be repeated.

FIG. 1 is a block diagram showing a video encoding apparatus according to an exemplary embodiment of the present invention.

Referring to FIG. 1, a video encoding apparatus 100 may include a picture splitter 105, a predictor 110, a transformer 115, a quantizer 120, a realignment unit 125, an entropy encoder 130, a dequantizer 135, an inverse transformer 140, a filter unit 145, and a memory 150.

Each component shown in FIG. 1 are independently shown so as to represent different characteristic functions in the video encoding apparatus and does not mean that each component is formed in separated hardware or a single software configuration unit. In other words, each constitutional part includes each of enumerated constitutional parts for convenience. Thus, at least two constitutional parts of each constitutional part may be joined to form one constitutional part or one constitutional part may be divided into a plurality of constitutional parts to perform each function. The embodiment where each constitutional part is joined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance The structure including only the indispensable constituents except the selective constituents used in improving only performance is also included in the scope of the present invention.

The picture splitter 105 may split the input picture in at least one processing unit. In this case, the processing unit may be a prediction unit (PU), a transform unit (TU), and an encoding unit (CU). The picture splitter 105 may split a single picture in a joint of a plurality of encoding units, prediction units, and transform units and may code the pictures by selecting a joint of the single encoding unit, the prediction unit, and the transform using a predetermined reference (for example, cost function).

For example, the single picture may be divided into the plurality of encoding units. In order to split the encoding unit in the picture, a recursive tree structure such as a quad tree structure may be used. The encoding unit split in other encoding units using a route as a single video or a maximum size encoding unit may be split with children nodes corresponding to the number of split encoding units. The encoding unit that is no more split according to a predetermined limitation becomes a leaf node. That is, the single encoding unit may be split in a maximum of four other encoding units if it is assumed that only a quadratic split is performed on a single encoding unit.

Hereinafter, in the exemplary embodiment of the present invention, a meaning of the encoding unit may be used as a meaning of the encoding unit as well as a meaning of the decoding unit.

The prediction unit may be split with shapes, such as at least one square, one rectangle, or the like, having the same size within the single encoding unit or a type in one of the split prediction units within the single encoding unit may be split with a type different from other prediction units.

When the prediction unit performing intra-picture prediction is generated based on the encoding unit, if it is assumed that the prediction unit is not the minimum encoding unit, an inter-picture prediction may be performed without the encoding unit being spilt into a plurality of prediction units (N×N).

The predictor 110 may include an inter-picture predictor performing the inter-picture prediction and an intra-picture prediction performing the inter-picture prediction. It is possible to determine whether the inter-picture prediction is performed on the prediction unit or the intra-picture prediction is performed thereon and it is possible to determine detailed information (for example, an intra-picture prediction mode, a motion vector, a reference picture, or the like) according to each prediction method. In this case, a processing unit performing the prediction and a processing unit defining the prediction method and the detailed contexts may be different from each other. For example, the prediction method, the prediction mode, or the like, may be determined in the prediction unit and the prediction performance may also be performed in the transform unit. A residual value (residual block) between the generated prediction block and an original block may be input to the transformer 115, In addition, prediction mode information, motion vector information, or the like, used for prediction are encoded in the entropy encoder 130, together with the residual value, which may be in turn transmitted to the decoder. When a specific encoding mode is used, it is possible to code the original block as it is without generating the prediction block through the predictor 110 and transmit the encoded original block to the decoder.

The inter-picture predictor may predict the prediction unit based on at least one picture information of pictures before and after the current picture. The inter-picture predictor may include a reference picture interpolator, a motion predictor, and a motion compensator.

The reference picture interpolator may receive reference picture information from the memory 150 and may generate pixel information of integer pixels or less in the reference picture. In the case of a luminance pixel, in order to generate the pixel information of an integer pixel or less in a ¼ pixel unit, a DCT-based 8 tap interpolation filter having different filter coefficients may be used. In the case of a chrominance pixel, in order to generate the pixel information of an integer pixel or less in a ⅛ pixel unit, a DCT-based 4 tap interpolation filter having different filter coefficients may be used.

The motion predictor may perform the motion prediction based on the reference picture interpolated by the reference picture interpolator. As the method for calculating the motion vector, various methods such as full search-based block matching algorithm (FBMA), three step search (TSS), new three-step search algorithm (NTS), or the like, may be used. The motion vector may have a motion vector value in a ½ or ¼ pixel unit based on the interpolated pixel. The motion predictor may predict the current prediction unit by making the motion prediction method different. As the motion prediction method, various methods such as a skip method, a merge method, an advanced motion vector prediction (AMVP) method, or the like, may be used.

The intra-picture predictor may generate the prediction unit based on the reference pixel information around the current block that is the pixel information in the current picture. Since the peripheral blocks in the current prediction unit are blocks performing the inter-picture prediction, the reference pixel included in the block performing the inter-picture prediction may be replaced with the reference pixel information of the block performing the intra-picture prediction therearound, when the reference pixel is a pixel subjected to the inter-picture prediction That is, when the reference pixel is not used, the non-used reference pixel information may be replaced with at least one of the usable reference pixels.

In the intra-picture prediction, the prediction mode may include a directional prediction mode using the reference pixel information according to the prediction direction and a non-directional mode not using the directional information at the time of performing the prediction. The mode for predicting the luminance information and the mode for predicting the chrominance information may be different from each other and the intra-picture prediction mode information predicting the luminance information so as to predict the chrominance information or the predicted luminance signal information may be used.

When the size of the prediction unit and the size of the transform unit are the same at the time of performing the intra-picture prediction, even though the intra-picture prediction is performed on the prediction unit based on a pixel present at the left of the prediction unit, a pixel present at the top left thereof, and a pixel present at the top, when the size of the prediction unit and the size of the transform unit is different from each other at the time of performing the intra-picture prediction, the intra-picture prediction may be performed using the reference pixel based on the transform unit. In addition, the intra-picture prediction using N×N split may be performed on only the minimum encoding unit.

The intra-picture prediction method may generate the prediction block after an adaptive intra smoothing filter is applied to the reference pixel according to the prediction mode. The type of the AIS filter applied to the reference pixel may be different. In order to perform the intra-picture prediction method, the intra-picture prediction mode of the current prediction unit may be predicted from the intra-picture prediction mode in the prediction unit present around the current prediction unit. When the prediction mode in the current prediction unit is predicted using the mode information predicted from the peripheral prediction unit and when the intra-picture prediction mode in the current prediction unit and the peripheral prediction unit are the same, the information that the prediction mode in the current prediction unit and the peripheral prediction unit are the same may be transmitted using the predetermined flag information and when the prediction modes in the current prediction unit and the peripheral prediction unit are different from each other, the prediction mode information of the current block may be encoded using the entropy encoding.

In addition, the residual block including the residual information that is a difference value between the prediction unit performing the prediction and the original block in the prediction unit may be generated based on the prediction unit generated in the predictor 110. The generated residual block may be input to the transformer 115, The residual block including the original block and the residual information in the prediction unit generated through the predictor 110 may be transformed using the transform method such as a discrete cosine transform (DCTO or a discrete sine transform (DST) in the transformer 115, In order to transform the residual block, whether the DCT is applied or the DST is applied may be determined based on the intra-picture prediction mode information in the prediction unit used so as to generate the residual block.

The quantizer 120 may quantize values transformed into a frequency domain in the transformer 115, Quantization coefficients may be changed according to the block or the importance of video. The values calculated in the quantizer 120 may be provided to the dequantizer 135 and the realignment unit 125.

The realignment unit 125 may perform the realignment of coefficient values for quantized residual values.

The realignment unit 125 may change two-dimensional block type coefficients into one-dimensional vector type by a coefficient scanning method. For example, the realignment unit 125 may scan from DC coefficients to coefficients in a high frequency domain by using a zig-zag scan method to change the block type coefficients into the one-dimensional vector type. Rather than the zig-zag scan method, a vertical scan method scanning the two-dimensional block type coefficients in a column direction and a horizontal scan method scanning the two-dimensional block type coefficients in a row direction may be used according to the size of the transform unit and the inter-picture prediction mode. That is, whether any scan method of the zig-zag scan, the vertical direction scan, and the horizontal direction scan may be determined according to the size of the transform unit and the intra-picture prediction mode.

The entropy encoder 130 may perform the entropy encoding based on the values calculated by the realignment unit 125. For the entropy encoding, encoding methods such as exponential golomb, context-adaptive variable length coding (CAVLC), context-adaptive binary arithmetic encoding (CABAC), or the like, may be used.

The entropy encoder 130 may code various information such as residual coefficient information and block type information, prediction mode information, split unit information, prediction unit information, transmission unit information, motion vector information, reference frame information, block interpolation information, filtering information, or the like, in the encoding unit from the realignment unit 125 and the predictor 110.

The entropy encoder 130 may perform the entropy encoding on the coefficient values in the encoding unit input from the realignment unit 125.

The entropy encoder 130 may be stored with a table for performing the entropy encoding such as a variable length coding table and may perform the entropy encoding using the stored variable length coding table. In performing the entropy encoding, code word allocation for the code numbers of the corresponding information to some code words included in the table may be changed by using a counter using method or a direct swapping method For example, in the case of several upper code numbers to which a smaller bit number of code words is allocated in the table mapping the code numbers and the code words, a mapping sequence of the table adaptively mapping the encoder words to the code numbers so as to allocate the code words of a short length to the code numbers in which the summed generation frequency of the code numbers is largest by using the counter may be changed. When the frequency counted in the counter reaches the predetermined threshold value, the counting may be again performed by dividing the counting frequency written in the counter into ½.

The position of the code numbers in the table that do not perform the counting may be changed with the position of the code numbers just above the entropy encoding table using the direct swapping method when the information corresponding to the code number is generated. That is, the smaller number of bits allocated to the corresponding code number in the entropy encoding table may be allocated.

The entropy encoder 130 may code the integrated code block flag at the current transform depth and code the split information flag based on the integrated code block flag information. In addition, the entropy encoder 130 may join and code the split information flag based on the integrated code block flag information. Hereinafter, the exemplary embodiment of the present invention will be described below with reference to the additional encoding method.

The dequantizer 135 and the inverse transformer 140 inversely quantize the quantized values in the quantizer 120 and inversely transform the values transformed in the transformer 115, The residual generated in the dequantizer 135 and the inverse transformer 140 may generate a reconstructed block by being joined with the prediction unit predicted through a motion estimator, a motion compensator, and an intra predictor that are included in the predictor 110.

The filter unit 145 may include at least one of a deblocking filter, an offset compensator, and an adaptive loop filter (ALF).

The deblocking filter may remove block distortion generated due to a boundary between the blocks at the reconstructed picture. In order to determine whether the deblocking is performed, it is possible to determine whether the deblocking filter is applied to the current block based on the pixels included in several columns or rows included in the block. When the deblocking filter is applied to the block, a strong filter or a weak filter may be applied according to necessary deblocking filtering strength. In addition, in applying the deblocking filter, horizontal direction filtering and vertical direction filtering at the time of performing the vertical filtering and the horizontal filtering may be processed in parallel.

The offset compensator may correct the offset with the original picture for the video performing the deblocking in the pixel unit In order to perform the offset compensation for the specific picture, the predetermined number of pixels included in the video is divided and then, the region performing the offset is determined, and the method of applying the offset to the corresponding region and the method of applying the offset in consideration of the edge information each pixel may be used.

The adaptive loop filter (ALF) may perform the filtering based on a value obtained by comparing the filtered reconstructed picture and the original picture. The filtering may be differently performed for each group by dividing the pixel included in the video into the predetermined group and then, determining a single filter to be applied to the corresponding group. The information regarding whether the ALF is applied may be transmitted for each encoding unit (CU) and the size and coefficient of the ALF to be applied to each block may be changed. The ALF may have various type and thus, the number of coefficients included the filter may be changed. The filtering related information of the ALF (filter coefficient information, ALF on/off information, filter type information) may be transmitted by being included in the predetermined parameter set in the bit stream.

The memory 150 may store the reconstructed block or the pictures calculated through the filter unit 145, wherein the stored reconstructed blocks or pictures may be provided to the predictor 110 at the time of performing the inter-picture prediction.

Figure 2:
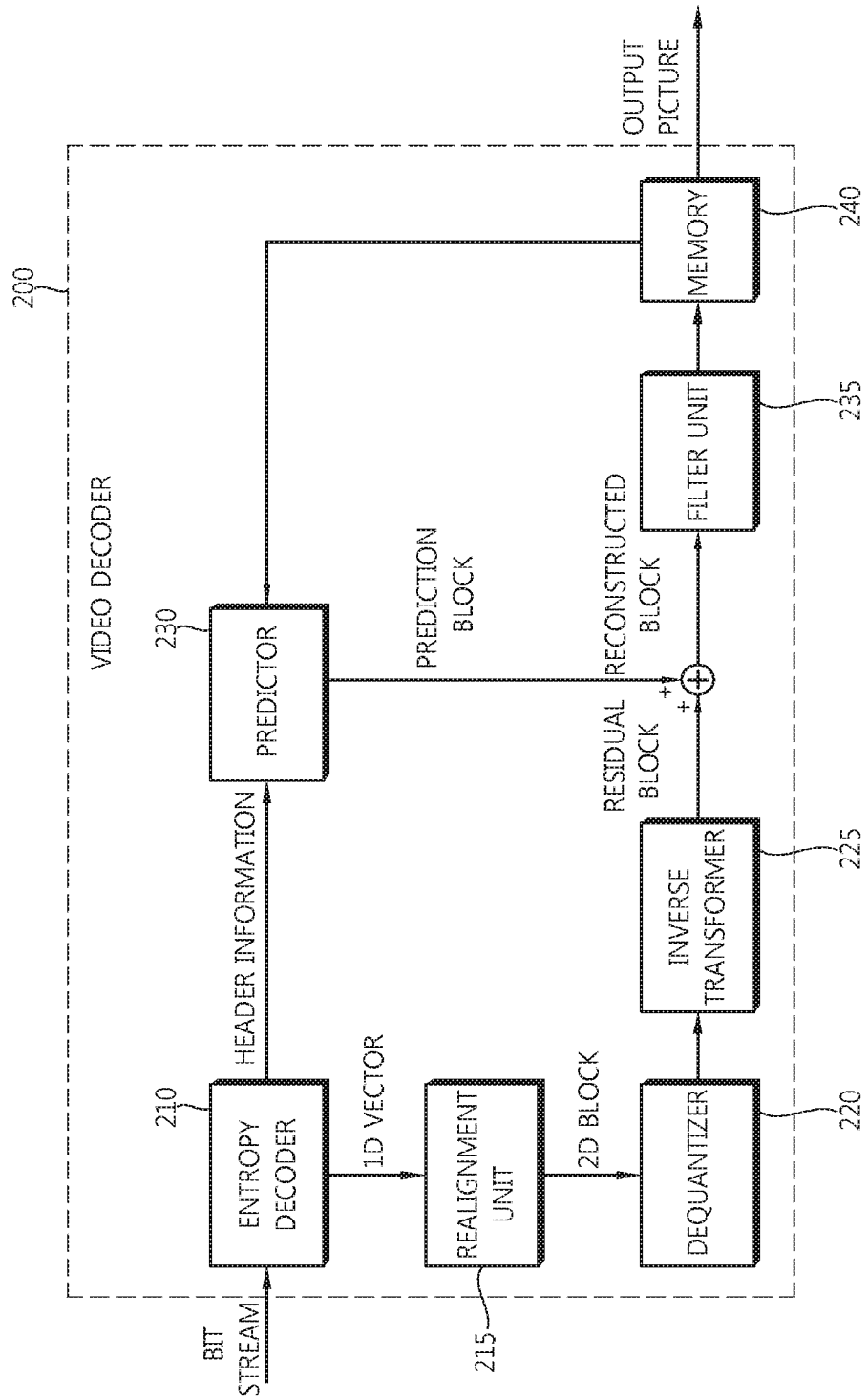
FIG. 2 is a block diagram showing a video decoder according to another exemplary embodiment of the present invention.

FIG. 2 is a block diagram showing a video decoder according to another exemplary embodiment of the present invention.

Referring to FIG. 2, a video decoder 200 may include an entropy decoder 210, a realignment unit 215, a dequantizer 220, an inverse transformer 225, a predictor 230, a filter unit 235, and a memory 240.

In the video coder, when the video bit stream is input, the input bit stream may be decoded by a procedure reverse to the video coder.

The entropy decoder 210 may perform the entropy decoding by a procedure reverse to one performing the entropy encoding in the video coder. For example, in the video coder, the VLC table used to perform the entropy encoding is implemented by the same variable length coding table even in the entropy decoder to perform the entropy decoding. The information for generating the prediction block among the decoded information in the entropy decoder 210 may be provided to the predictor 230 and the residual performing the entropy decoding in the entropy decoder may be input to the realignment unit 215.

Similar to the entropy encoder even in the entropy decoder 210, the code word allocation table may be changed using the counter or the direct swapping method and perform the entropy decoding based on the changed code word allocation table.

The information regarding the intra-picture prediction and the inter-picture prediction performed in the encoder may be decoded. As described above, when there are predetermined limitations at the time of performing the intra-picture prediction and the inter-picture prediction in the video coder, the information regarding the intra-picture prediction and the inter-picture prediction for the current block may be provided by performing the entropy decoding based on the above-mentioned limitations. The entropy decoder may perform the decoding operation described in FIGS. 3 to 8 of the exemplary embodiment of the present invention.

The entropy decoder 210 may decode the integrated code block flag information in the transform unit and decode the split information flag based on the size information and the integrated code block flag information in the transform unit. In addition, the pattern information in the transform unit is decoded based on the transform unit information coupling flag encoded by coupling the integrated code block flag with the transform information flag and the code block flag information and the split information flag information in the transform unit corresponding to the pattern information may be decoded based on the pattern information. The entropy decoding process will be described in detail in the following exemplary embodiment of the present invention.

The realignment unit 215 may perform the realignment based on a method for realigning bit streams, which are subjected to the entropy decoding in the entropy decoder 210, in the coder. The coefficients represented by the one-dimensional vector type may be again recovered into the coefficients in the two-dimensional block type and realigned. The realignment unit may perform the realignment by receiving information relating to the coefficient scanning performed in the encoder and a method for reversely scanning the information based on the scanning sequence performed in the corresponding coder.

The dequantizer 220 may perform the dequantization based on the quantization parameter provided in the encoder and the realigned coefficient values of the block.

The inverse transformer 225 may perform the DCT performed in the transformer and the inverse DCT and the inverse DST on the DST with reference to the quantization results performed in the video coder. The inverse transform may be performed based on the transmission unit determined in the video coder. The transformer of the video encoder may selectively perform the DCT and the DST according to the prediction method and various information such as, the size and the prediction direction of the current block, or the like, and the inverse transformer 225 of the video decoder may perform the inverse transform based on the transform information performed in the transformer of the video coder.

At the time of performing the transform, the transform may be performed based on the encoding unit rather than the transform unit.

The predictor 230 may generate the prediction block based on the prediction block generation related information provided from the entropy decoder 210 and the previously decoded block or the picture information provided from the memory 240.

As described above, similar to the operation in the video coder, when the size of the prediction unit and the size of the transform unit are the same as each other at the time of performing the intra-picture, even though the intra-picture prediction is performed on the prediction unit based on a pixel present at the left of the prediction unit, a pixel present at the top left thereof, and a pixel present at the top, when the size of the prediction unit and the size of the transform unit is different from each other at the time of performing the intra-picture prediction, the intra-picture prediction may be performed using the reference pixel based on the transform unit. In addition, the intra-picture prediction using N×N split may be performed on only the minimum encoding unit.

The predictor 230 may include a prediction unit determinator, an inter-picture predictor, and an intra-picture predictor. The prediction unit determinator may receive various information such as the prediction unit information input from the entropy decoder, the prediction mode information of the intra-picture prediction method, the motion prediction related information of the inter-picture prediction method, or the like, divide the prediction unit in the current encoding unit, and differentiate whether the prediction unit performs the inter-picture prediction or the intra-picture prediction. The inter-picture predictor may perform the inter-picture prediction for the current prediction unit based on the information included in at least one of the pictures before or after the current picture including the current prediction unit by using the information necessary for the inter-picture prediction of the current prediction unit provided from the video coder.

In order to perform the inter-picture prediction, it is possible to determine whether the motion prediction method of the prediction unit included in the corresponding encoding unit may corresponds to any one of a skip mode, a merge mode, and an AMVP mode based on the encoding unit.

The intra-picture predictor may generate the prediction block based on the pixel information within the current picture. When the prediction unit is a prediction unit performing the intra-picture prediction, the intra-picture prediction may be performed based on the intra-picture mode information of the prediction unit provided from the video coder. The intra-picture predictor may include an AIS filter, a reference pixel interpolator, and a DC filter. The AIS filter, which is a part performing the filtering on the reference pixel of the current block, may be applied by determining whether the filter is applied according to the prediction mode of the current prediction unit. The AIS filtering may be performed on the reference pixel of the current block by using the prediction mode of the prediction unit and the AIS filter information provided from the video coder. When the prediction mode of the current block is a mode that does not perform the AIS filtering, the AIS filter may not be applied.

The reference pixel interpolator may generate the reference pixel in the pixel unit of the integer value or less by interpolating the reference pixel when the prediction mode of the prediction unit is the prediction unit performing the intra-picture prediction based on the pixel value interpolating the reference pixel. When the prediction mode of the current prediction unit is the prediction mode generating the prediction block without interpolating the reference pixel, the reference pixel may not be interpolated. The DC filter may generate the prediction block through the filtering when the prediction mode of the current block is the DC mode.

The reconstructed block or picture may be provided to the filter unit 235. The filter unit 235 may include a deblocking filter, an offset compensator, and ALF.

The information regarding whether the deblocking filter is applied to the corresponding block or the picture from the video encoder and if it is determined that the deblocking filter is applied, the information regarding whether the strong filter is applied or the weak filter is applied may be provided. The deblocking filter of the video decoder may receive the deblocking filter related information provided from the video encoder and may perform the deblocking filtering on the corresponding block in the video decoder. Similar to the video coder, the vertical deblocking filtering and the horizontal deblocking filtering are first performed but any one of the vertical deblocking and the horizontal deblocking may be performed in the overlapping portion. The vertical deblocking filtering or the horizontal deblocking filtering that is not previously performed at the overlapping portion where the vertical deblocking filtering and the horizontal deblocking filter overlap each other may be performed. It is possible to perform parallel processing of the deblocking filtering through the deblocking filtering process.

The offset compensator may perform the offset compensation on the reconstructed picture based on the type of the offset compensation, the offset value information, or the like, applied to the picture at the time of the encoding.

The ALF may perform the filtering based on the value obtained by comparing the reconstructed picture after the filtering is performed and the original picture. The ALF may be applied to the encoding unit based on the information regarding whether the ALF is applied, the ALF coefficient information, or the like, that are provided from the coder. The ALF information may be provided by being included in the specific parameter set.

The memory 240 may store the reconstructed picture or the block so as to be used as the picture or the reference block and may also provide the reconstructed picture to an output unit.

As described above, in the exemplary embodiment of the present invention, the encoding unit is used as a term to be the encoding unit for convenience of explanation, but may be the unit performing the encoding as well as the decoding. Hereinafter, the encoding/decoding method of the intra-picture prediction mode using two candidate intra prediction modes described in FIGS. 3 to 12 according to the exemplary embodiment of the present invention may be performed so as to meet functions of each module described in FIGS. 1 and 2. The encoder and decoder are included in the scope of the present invention.

Hereinafter, a binary code representing the predetermined flag information used in the exemplary embodiment of the present invention is only by way of example and therefore, the same information may be represented by different binary codes, which is included in the scope of the present invention.

Figure 3:
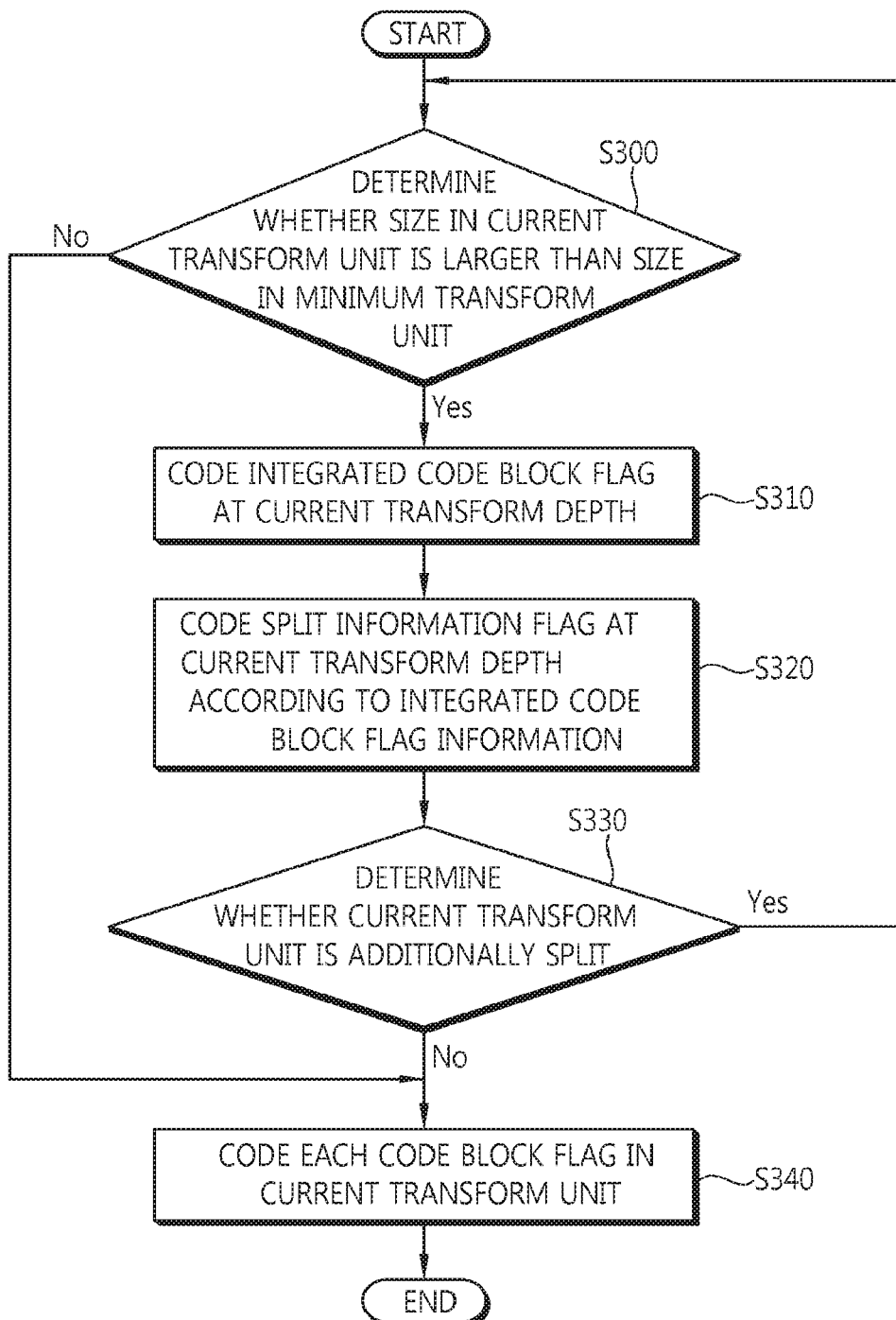
FIG. 3 is a flow chart showing a method for transmitting transform unit information using a quad tree structure according to another exemplary embodiment of the present invention.

FIG. 3 is a flow chart showing a method for transmitting transform unit information using a quad tree structure according to another exemplary embodiment of the present invention.

Referring to FIG. 3, it is determined whether the size of the current transform unit is larger than a minimum transform unit (S300).

The size of the current transform unit may be calculated based on coefficients representing transform depth information (trafoDepth), size information in a maximum transform unit or may directly be calculated through coefficients representing block size information.

The integrated code block flag information is transmitted only when the size of the current transform unit is larger than the minimum transform unit and does not transmit the integrated code block flag information when the size of the current transform unit is the size of the minimum transform unit, each code block flag cbf_y, cbf_u, and cbf_v may immediately be encoded in the current transform unit (S340).

The code block flag cbf_luma or cbf_y may represent whether at least one transform coefficient rather than 0 among the transform coefficient values transforming the luminance signals is present in the current transform unit, cbf_cb may represent whether at least one transform coefficient rather than 0 among the transform coefficient values transforming the chrominance signal cb is present in the current transform unit, and cbf_cr may represent whether at least one transform coefficient rather than 0 among the transform coefficient values transforming the chrominance signal cr is present in the current transform unit.

When the size of the current transform unit is larger than the minimum transform unit, the integrated code block flag is encoded at the current transform depth (S310).

The integrated code block flag, is a flag representing whether the transform quantization coefficients of the luminance signal and the chrominance signal are present, means that at least one transform coefficient rather than 0 is present in the corresponding transform unit when the integrated code block flag is not 0.

The integrated code flag may be used as the flag representatively representing the Y/Cb/Cr code block flag. If any one of cbfs of Y/Cb/Cr is not 0, the integrated code flag may be represented by a value rather than 0 and if all of cbfs of Y/Cb/Cr are 0, the integrated code flag may be represented by 0.

Whether the fixed depth used by the integrated code block flag is applied to various units such as sequence, picture, slice, or the like, may be changed by fixedly defining the transform depth used by the integrated code block flag in advance or adaptively changing the transform depth to which the integrated code block flag may be applied. The information for adaptively changing the transform depth may be included in a sequence parameter set (SPS), a picture parameter set (PPS), and a slice header.

The split information flag is phase-coded at the current transform depth according to the integrated code block flag information (S320).

The information regarding whether the current transform unit is split may be transmitted through context element split_transform_flag. Hereinafter, in the exemplary embodiment of the present invention, the split information flag may be used as the same meaning as split_transform_flag.

For example, when the current transform unit is split, the value of the split information flag is set to be values rather than 0 and when the current transform unit is not split, the value of the split information flag may be set to be 0. The context element and the binary code for representing the context element information used in the exemplary embodiment of the present invention is only by way of an example and therefore, another context element and the binary code of another context element may be used unless they are in the scope of the present invention.

In the block information transmission method using the quad tree according to the exemplary embodiment of the present invention, the split information may be differently transmitted according to the integrated code flag.

When the integrated code block flag is not 0 and the current transform unit is not split into the lower transform unit, the integrated code block flag has 0 as the split information flag and when the integrate code block flag is not 0 and the current transform unit is split into the lower transform unit, the integrated code block flag may have the value rather than 0 as the split information flag value. In addition, when the integrated code block flag is 0, the unnecessary split information may not be transmitted by not additionally transmitting the split information for the current transform unit. Joint encoding may be performed by joining the integrated code block fag and the split information flag. When the integrated code block flag and the split information flag is joint-coded, procedures of steps S300 to S320 may be changed. When the integrated code block flag is applied, the encoding method determines what information among cbf_y, cbf_u, cbf_v, and split_flag needs to be encoded in the current transform unit and then, represents the split_transform_flag by the predetermined pattern information and may represent each of the code block flag cbf_y, cbf_u, and cbf_v and the split information flag split_transform_flag in the current transform unit based on the pattern information. The encoding method using the integrated code flag will be described in more detail below.

It is determined whether the current transform unit is additionally split (S330).

When the transform unit is additionally split, it is determined whether the size of the split transform unit by returning to S300 is the transform unit of the minimum size and if it is determined that the split transform unit is the transform unit of the minimum size, a procedure for encoding the transform unit information may be ended after immediately converting the transform coefficient information cbf_y, cbf_u, and cbf_v each present in the transform unit without transmitting the integrated code block flag information by returning to step S340.

Hereinafter, a method for transmitting the integrate code block flag and the split information flag based on the encoding unit will be described with reference to FIGS. 4 to 6. That is, the transform coefficient information in the transform unit and the split information included in the encoding unit may be transmitted for each unit. However, in the block information transmitting method using a tree according to the exemplary embodiment of the present invention may transmit the integrated code block flag and the split information flag for each transform unit.

Figure 4:
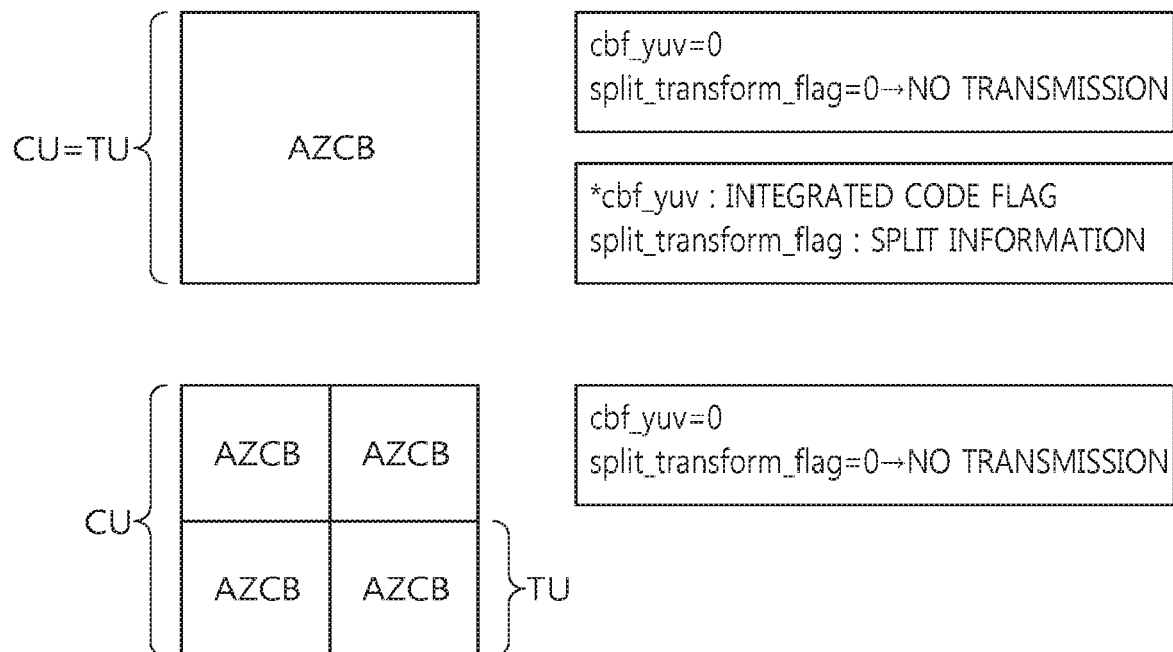
FIG. 4 is a conceptual diagram showing a method for applying an integrated code block flag and a division information flag according to another exemplary embodiment of the present invention.

FIG. 4 is a conceptual diagram showing a method for applying an integrated code block flag and a division information flag according to another exemplary embodiment of the present invention.

Referring to FIG. 4, the top end of FIG. 4 and the bottom end of FIG. 4 are an all zero coefficient block (AZCB) in which the transform coefficient included in the current transform unit is not present and when the integrated code block flag is applied to only the uppermost transform block, FIG. 4 shows a conceptual diagram of the method for transmitting the integrated code block flag and the split information flag.

Hereinafter, in the exemplary embodiment of the present invention, the all zero coefficient block (AZCB) in which the transform coefficient is not in the current transform unit may be represented by a term called the zero transform coefficient transform unit.

The top end of FIG. 4 shows the case in which the size of the encoding unit is the same as the size of the uppermost transform unit and the case in which the transform coefficient included in the transform unit is not present.

When the size of the encoding unit is the same as the size of the uppermost transform unit and the transform coefficient included in the transform unit is not present, additional split is not performed. As a result, the integrated code block flag is set to be 0 in the uppermost transform unit and the size information of the current transform unit and the transform coefficient information may be transmitted without transmitting the split information flag.

That is, in the block information transmitting method using the quad tress according to the exemplary embodiment of the present invention, since the zero transform coefficient transform unit in which the transform coefficient is not present is not split in the additional transform unit and therefore, the split information is not unnecessary, such that the split information flag is not additionally transmitted.

The bottom end of FIG. 4 shows the case in which the size of the encoding unit is different from the size of the uppermost transform unit and the case in which the transform coefficient included in the transform unit is not present.

When the size of the uppermost transform unit is smaller than the encoding unit and the uppermost transform unit included in the encoding unit is the all zero transform coefficient transform unit, the integrated code block flag is set to be 0 and the size information of the current transform unit and the transform coefficient information may be transmitted without transmitting the split information flag.

Figure 5:
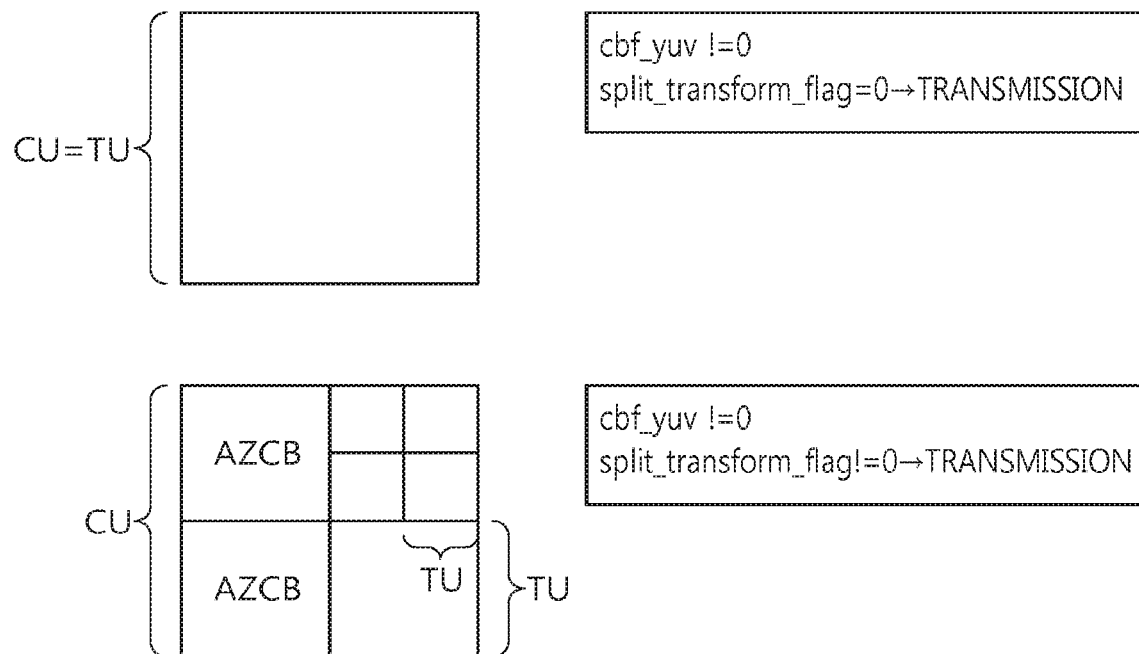
FIG. 5 is a conceptual diagram showing a method for applying an integrated code block flag and a division information flag according to another exemplary embodiment of the present invention.

FIG. 5 is a conceptual diagram showing a method for applying an integrated code block flag and a division information flag according to another exemplary embodiment of the present invention.

When the top end and the bottom end of FIG. 5 are provided with the transform coefficient included in the current transform unit and the integrated code block flag is applied to only the uppermost transform block, FIG. 5 is a conceptual diagram showing the method for transmitting the integrated code flag and the split information flag.

The top end of FIG. 5 shows the case in which the size of the encoding unit is the same as the size of the uppermost transform unit and the case in which the uppermost transform coefficient is not split into the additional transform unit while the transform coefficient being present.

The integrated code block flag is set to be a value rather than 0 in the uppermost transform unit and the split information flag is transmitted as 0, thereby transmitting the information regarding whether the current transform unit is split and the transform coefficient information.

The bottom end of FIG. 5 shows the case in which the size of the encoding unit is the same as the size of the uppermost transform unit and the case in which the uppermost transform unit is split into the additional transform unit while the transform coefficient being present.

When the size of the uppermost transform unit is the same as the size of the encoding unit and at least on of the lower split transform units is a block in which the transform coefficient is present, the integrated code flag is set to be a value rather than 0 in the uppermost transform unit and the split information flag is transmitted as a value rather than 0 and as a result, whether the transform coefficient is present in the transform unit included in the current encoding unit and the split state may be represented.

Figure 6:
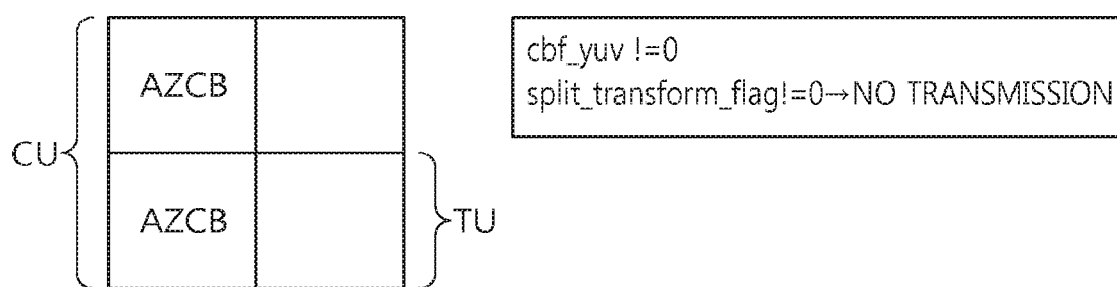
FIG. 6 is a conceptual diagram showing a method for applying an integrated code block flag and a division information flag according to another exemplary embodiment of the present invention.

FIG. 6 is a conceptual diagram showing a method for applying an integrated code block flag and a division information flag according to still yet another exemplary embodiment of the present invention.

FIG. 6 shows the case in which the size of the uppermost transform unit is smaller than the encoding unit and the transform coefficient is present.

When the size of the uppermost transform unit is smaller than the encoding unit and the transform coefficient is present, since the integrated code block flag is transmitted as a value rather than 0 and is split into the transform unit having the smaller size that the current encoding unit, the split information of the transform unit included in the current encoding unit may be represented without transmitting the split information flag.

Figure 7:
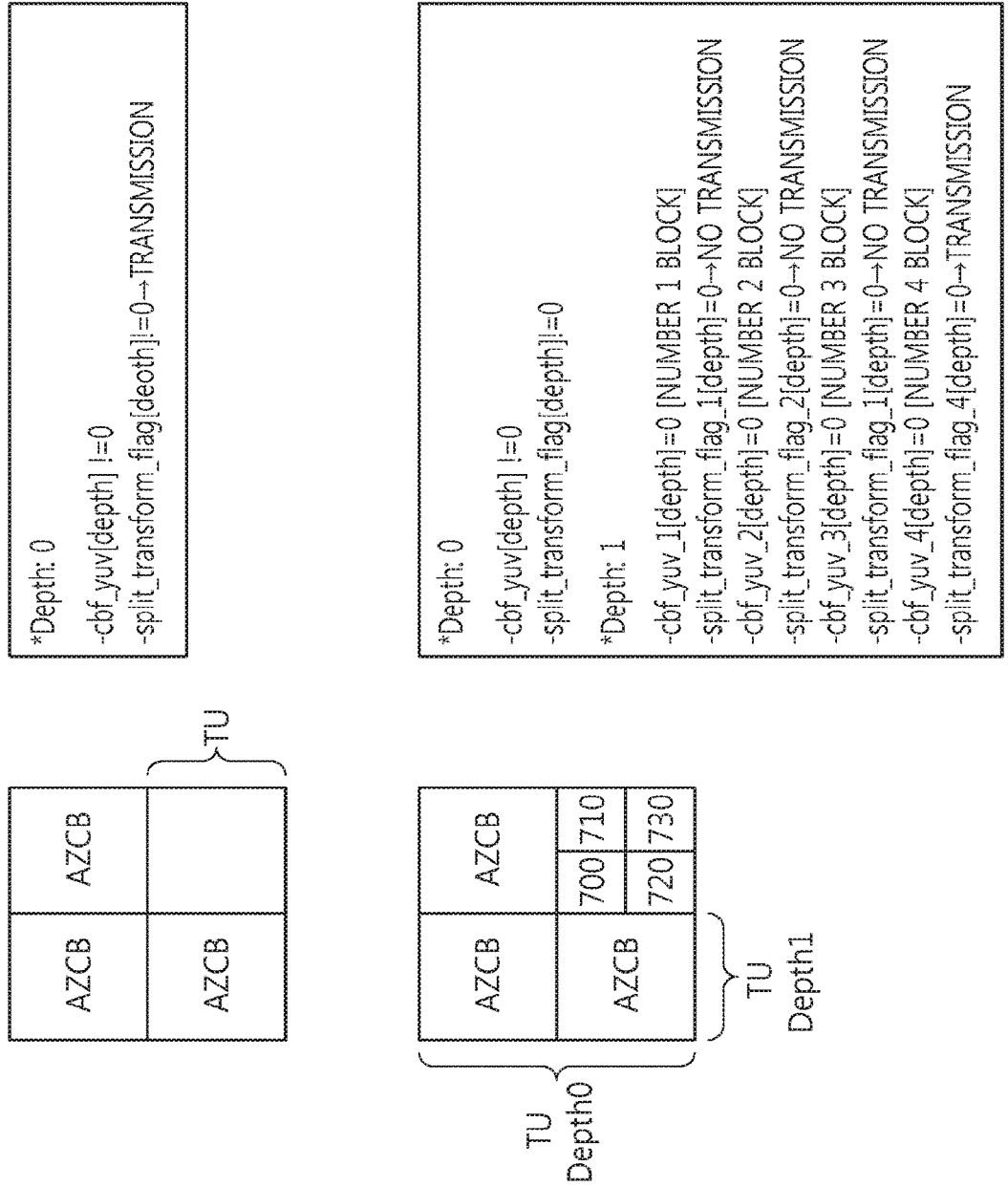
FIG. 7 is a conceptual diagram showing a method for differently applying an integrated code block flag and a division information flag according to another exemplary embodiment of the present invention depending on depth information in a transform unit

FIG. 7 is a conceptual diagram showing a method for differently applying an integrated code block flag and a division information flag according to another exemplary embodiment of the present invention depending on depth information in a transform unit.

In FIG. 7, the integrated code block flag and the split information flag may be transmitted based on the transform unit.

The top end of FIG. 7 shows the case in which the depth of the transform unit is 0, that is, the integrated code flag is applied to only the uppermost transform unit.

When the depth of the transform unit is 0, the integrated code block flag and the split information flag are applied to only the uppermost encoding unit, the integrated code block flag may be transmitted based on whether the transform coefficient is present in the upper transform unit based on the uppermost transform unit and the split information flag regarding whether the uppermost transform unit is additionally split may be transmitted. In the case of the top end of FIG. 7, since the transform coefficient is present based on the uppermost transform unit, the integrated code block flag may be set to be a value rather than 0 (cbf_yuv[depth]!=0) and the split information flag may be set to be 1 (split_transform_flag[depth]!=0).

The bottom end of FIG. 7 show the case in which the integrated code block flag and the split information flag is applied up to depth 1 of the transform unit.

In the bottom block of FIG. 7, when the depth of the transform unit is 0, since the transform coefficient is present, the integrated code block flag may be set to be a value rather than 0 and since the transform coefficient is split into the additional lower transform unit, the split information flag may be set to be 1.

When the transform depth is 1, the integrated code flag and the split information flag may again be applied to each transform unit. For example, when a first transform unit 700, a second transform unit 710, a third transform unit 720, and a fourth transform unit 730 are set based on a Z scan direction, the first transform unit 700 to the third transform unit 720 does not include the transform coefficient and therefore, the integrated code block flag is transmitted as 0 and all the transform coefficients are 0 and therefore, is not split into the additional coefficient unit, such that the split information flag may not be transmitted (cbf_yuv[depth]=0, split_transform_flag[depth]=0). Since the fourth transform unit 730 includes the transform coefficient and is additionally split into the transform unit, the integrated code flag is transmitted as a value rather than 0 and the split information flat may be transmitted as 1 (cbf_yuv [depth]!=0, split_transform_flag[depth]!=0).

The following Table 1 shows a context transmitting the integrated code flag and the split information flag.

TABLE 1 transform_tree {
   cbf_yuv (Depth)
   split transform flag (Depth)
   ... ... ...

Referring Table 1, the integrated code block flag and the split information flag may be represented in the transform tree syntax according to the transform unit depth information.

Figure 8:
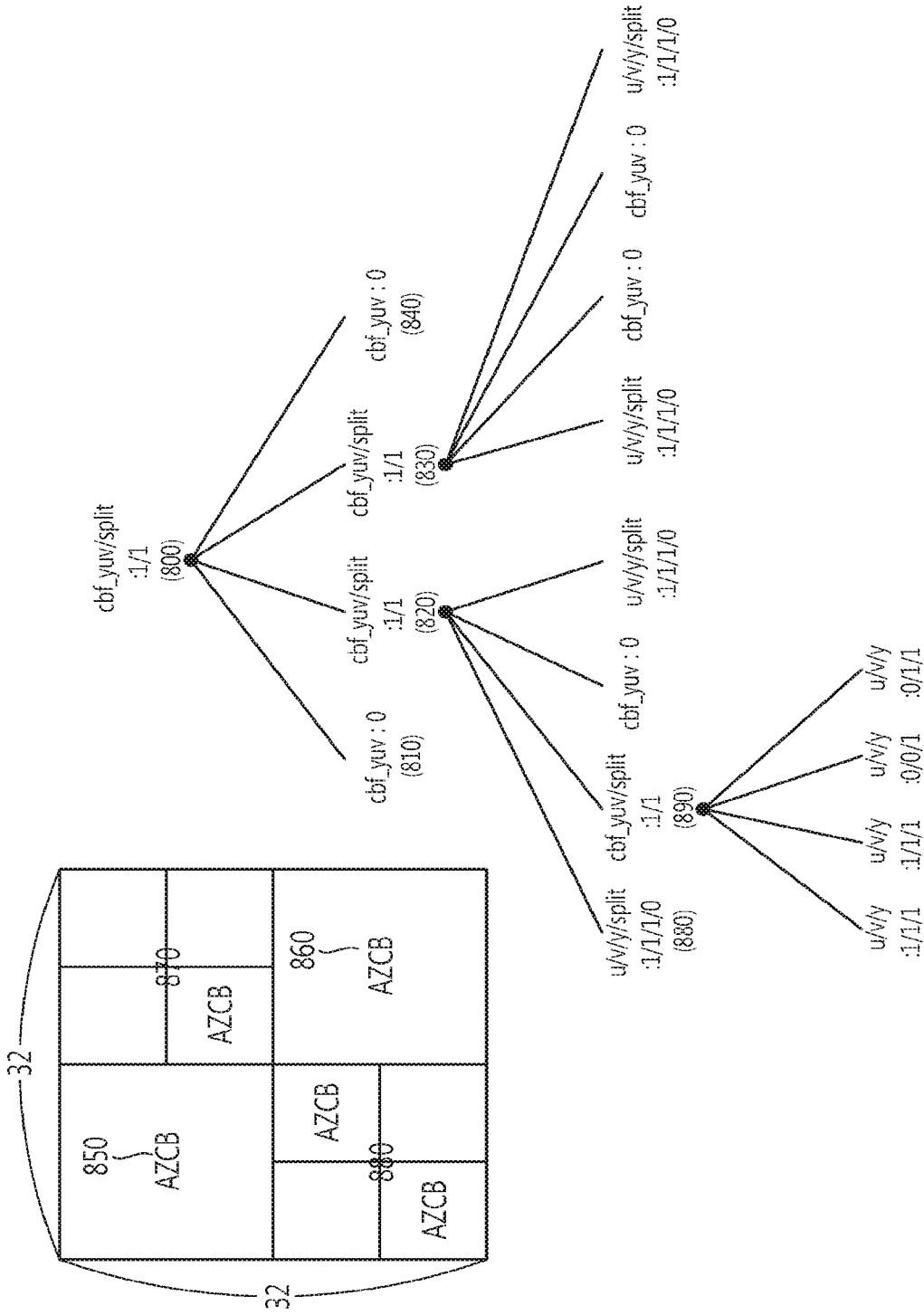
FIG. 8 is a conceptual diagram showing a process of decoding transform unit information in a quad tree structure according to another exemplary embodiment of the present invention.

FIG. 8 is a conceptual diagram showing a process of decoding transform unit information in a quad tree structure according to another exemplary embodiment of the present invention.

The transform unit disclosed at the left of FIG. 8 shows the case in which the size of the maximum transform unit is 32×32 and the size of the minimum transform unit is 4×4.

The left of FIG. 8 is a block showing the split state in the current transform unit and whether the transform coefficient is present and the right of FIG. 8 shows a tree structure showing a method for representing the integrated code block flag and the split information flag, respectively, at each depth of the transform unit.

FIG. 8 shows the case in which cbf_yuv_flag is a value rather than 0 and the transform coefficient is present at the transform unit depth 0, when the transform depth is 0 800 and the split_transform_flag is 1 and means that the spilt is performed in the lower transform unit.

FIG. 8 shows the information regarding whether the transform coefficient is present in the transform unit split into the transform unit depth 1 and whether the transform unit of the transform unit depth 1 is additionally split, when the transform depth is 1 810, 820, 830, and 840. That is, the first transform block 850 transmits 0 as the value of the integrated code block flag and does not additionally transmit the split information flag since the transform coefficient is not present. The fourth transform block 860 is the same as the first transform block and the second transform block 870 and the third transform block 880 transmit the integrated code block flag as the value rather than 0 since there is the transform coefficient and may transmit the split information flag as 1 since the integrated code block flag is split into the additional transform unit.

Considering the additionally split transform unit based on the second transform block, the current transform unit is not additionally split 880, each of the cbf_y, cbf_u, and cbf_v may be transmitted and when the current transform unit is additionally split 890, the integrated code block flag information and the split information flag may be transmitted in the current transform unit.

When the additionally split transform unit is the minimum transform unit 895, the cbf_y, cbf_u, and cbf_v information in the minimum unit may be immediately transmitted.

As described above, in the block information transmitting method using the quad tree according to another exemplary embodiment of the present invention and the apparatus using the method, the integrated code block flag and the split information flag may be joined and encoded.

When a joint of the integrated code block flag and the split information flag is patterned and encoded, the same information may be transmitted at smaller bit values, rather than encoding each of split_transform_flag representing the cbf_y, cbf_u, and cbf_v and the split information that is each component of the integrated code block flag. When the joint encoding is used, cbf_y, cbf_u, and cbf_v that are each component of the integrated code block flag and split_transform_flag information representing the split information may be joined and encoded.

cbf_yuv_split_flag joined and encoded by each component, that is, cbf_y, cbf_u, cbf_v, that may calculate the integrated code block flag with the split_transform_flag information may be represented by a single context element and the term, the transform unit information joint flag is used as the same meaning as the cbf_yuv_split_flag.

The following Table 2 is a table for performing the joint encoding for transmitting a joint of the integrated code flag and the split information flag.

TABLE 2

| Pattern No. | cbf_y | cbf_y | cbf_y | splitflag | Code Word |
|---|---|---|---|---|---|
| 1 | 1 | 0 | 0 | 0 | 1 |
| 2 | 1 | 0 | 0 | 1 | 10 |
| 3 | 1 | 1 | 0 | 0 | 110 |
| 4 | 1 | 1 | 0 | 1 | 1110 |
| 5 | 1 | 1 | 1 | 0 | 11110 |
| 6 | 1 | 1 | 1 | 1 | 111110 |
| ... | ... | ... | ... | ... | ... |

Referring to FIG. 2, the case in which cbf_y, cbf_u, and cbf_v that are each component of the integrated code block flag and the split_transform_flag representing the split information may be output may be defined by a single table. For example, the transform unit information joint flag may code the case in which each component, that is, cbf_y, cbf_u, and cbf_v of the integrated code block flag and the split_transform_flag representing the split information may be output based on the pattern information.

For example, in the transform unit of the upper unit, when the cbf_u and the cbf_v are encoded in advance, the cbf_u and the cbf_v information does not need to be encoded in the lower transform unit and when the current transform unit is the minimum encoding unit, only the cbf_y needs to be encoded. In this case, only the information regarding whether the luminance signal is present in the current transform unit through pattern 1 may be encoded. That is, the pattern in the current transform unit is 1 and the information regarding whether the luminance signal is additionally present in the current transform unit may be transmitted.

As another example, in the transform unit of the upper unit, the cbf_u and the cbf_v are encoded in advance and when the current transform unit is not the transform unit of the minimum size, the information regarding whether the luminance signal is present in the current transform unit based on pattern 2 may be encoded. That is, the pattern in the current transform unit is 2 and the information regarding whether the luminance signal in the current transform unit is present and whether the current transform unit is split may be transmitted.

Only the corresponding information may be encoded by determining what information is required to code in the current transform unit through the method using the pattern. .The pattern information may be first represented by the 4 bit information representing a cbf-y value by MSB, a cbf-u by MSB-1, cbf-v by MSB-2, and split_flag by LSB and the flag pattern may also be subjected to binary encoding using the VLC code at the time of being encoded later.

The following Table 3 shows a syntax structure of the transform unit information joint flag that joins and encodes the integrated code flag with the split information flag.

TABLE 3 transform_tree {
... ... ...
cbf_yuv_split_trans (Depth)
... ... ...

Referring to FIG. 3, the luminance signal information, the chrominance signal information, and the split information may be represented in the encoding unit by adding a cbf_yuv_split_trans that is a new context element to a transform_tree context.

In the block information transmitting method using the quad tree according to another exemplary embodiment of the present invention may join and code once the transform unit information joint flag of the transform units having the same size present at the same depth.

Figure 9:
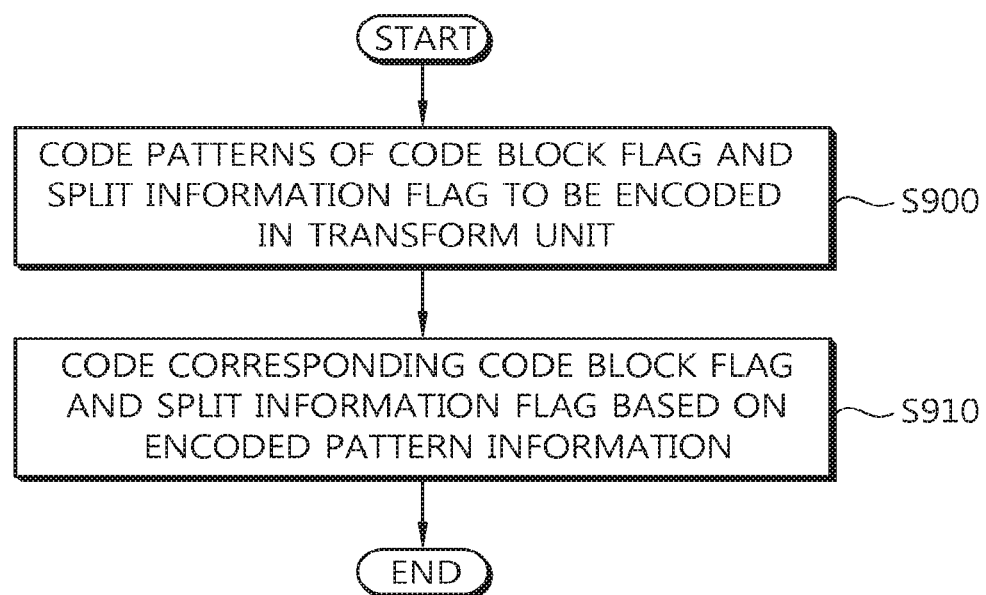
FIG. 9 is a flow chart showing a method for encoding transform coefficient information and division information in a transform unit when a transform unit information coupling flag is used.

FIG. 9 is a flow chart showing a method for encoding transform coefficient information and division information in a transform unit when a transform unit information coupling flag is used.

Referring to FIG. 9, a pattern of the code block flag and the split information flag to perform the encoding in the transform unit are encoded (S900).

The pattern information on the code block flag and the split information flag may be encoded based on Table 2.

The corresponding code block flag and the split information flag are encoded based on the encoded pattern information (S910).

The values of the code block flag and the split information flag corresponding to the corresponding pattern information are encoded based on the encoded pattern information.

For example, when the pattern information is 2, the information regarding whether the luminance signal is present in the current transform unit may be encoded.

Figure 10:
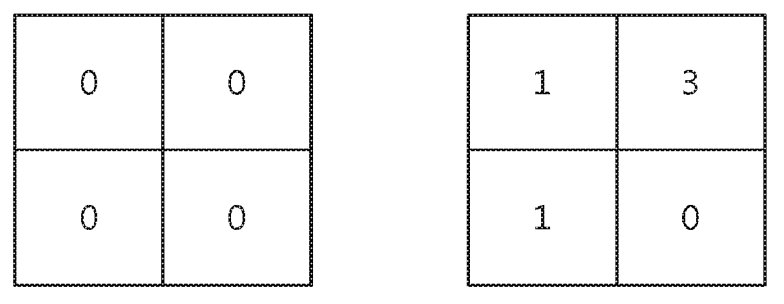

FIG. 10 is a conceptual diagram showing a method for coupling and encoding an integrated code flag and a division information flag according to another exemplary embodiment of the present invention and integrating transform unit information in transform units present at the same depth.

Referring to FIG. 10, each block represents the transform unit and numbers listed on each transform unit means the pattern information on the joint flag information. For convenience, 0 in the block and Table described below means pattern 1, pattern 1 means pattern 2, and pattern 3 means pattern 4.

Referring to the left of FIG. 10, the transform unit consists of four transform units that is pattern information 1 and referring to the right of FIG. 10, the transform unit consists of four transform units that are 2, 4, 2, and 1.

That is, the single upper transform unit pattern information may be generated by again joining the pattern information of the lower transform unit in the upper transform unit. The following Table 4 is a Table representing the upper transform unit pattern information.

TABLE 4

| | cbf_yuv_split_flag | | | | |
|---|---|---|---|---|---|
| Pattern No. | First Transform Unit | First Transform Unit | First Transform Unit | First Transform Unit | Code Word |
| 1 | 0 | 0 | 0 | 0 | 1 |
| 2 | 1 | 1 | 1 | 1 | 10 |
| 3 | 1 | 1 | 1 | 2 | 110 |
| 4 | 1 | 1 | 0 | 3 | 1110 |
| 5 | 1 | 3 | 1 | 0 | 11110 |
| 6 | 3 | 1 | 3 | 1 | 111110 |
| ... | ... | ... | ... | ... | ... |

Referring to Table 4, in the case of the transform unit present in the left of FIG. 8, number 1 transform unit may have a pattern value of cbf_yuv_split_trans of 0, number 2 transform unit may have a pattern value of cbf_yuv_split_trans of 0, number 3 transform unit may have a pattern value of cbf_yuv_split_trans of 0, and number 4 transform unit may have a pattern value of cbf_yuv_split_trans of 0 in a z scan direction and may also have new pattern information 1. In the case of the transform unit present in the left of FIG. 10, number 1 transform unit may have a pattern value of cbf_yuv_split_trans of 1, number 2 transform unit may have a pattern value of cbf_yuv_split_trans of 3, number 3 transform unit may have a pattern value of cbf_yuv_split_trans of 1, and number 4 transform unit may have a pattern value of cbf_yuv_split_trans of 5.

The upper transform block pattern information may also be used by being defined as the new context element in the transform tree context.

Figure 11:
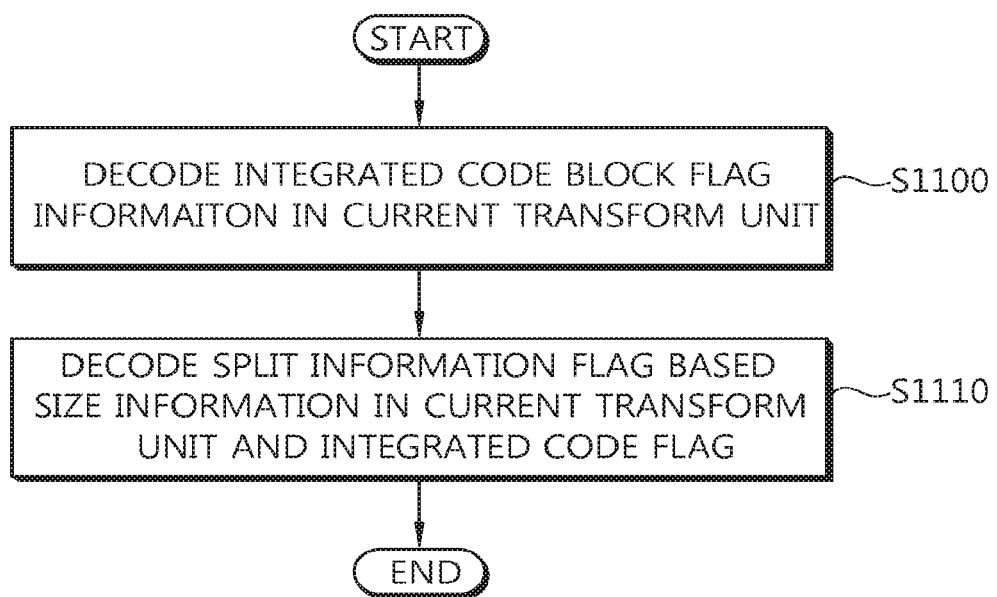
FIG. 11 illustrates a method to decode integrated code block flag information and split information flag based size information, in accord with an illustrative example.

FIG. 11 is a flow chart for decoding the block information having the quad tree structure according to another exemplary embodiment of the present invention. Referring to FIG. 11, the integrated code block flag information in the current transform unit is decoded (S1100).

The split information flag is decoded based on the size information of the current transform unit and the integrated code flag information (S1110).

When the transform unit information joint flag cbf_yuv_split_flag in which the above-mentioned integrated code block flag with the split_transform_flag are joined is used, processes of S1100 and S1110 may be changed. As described in Table 2, the transform unit information joint flag information in the current transform unit is decoded and the information regarding whether the luminance signal and the chrominance signal are present in the current transform unit or spilt based on the decoded pattern information may be additionally decoded.

Figure 12:
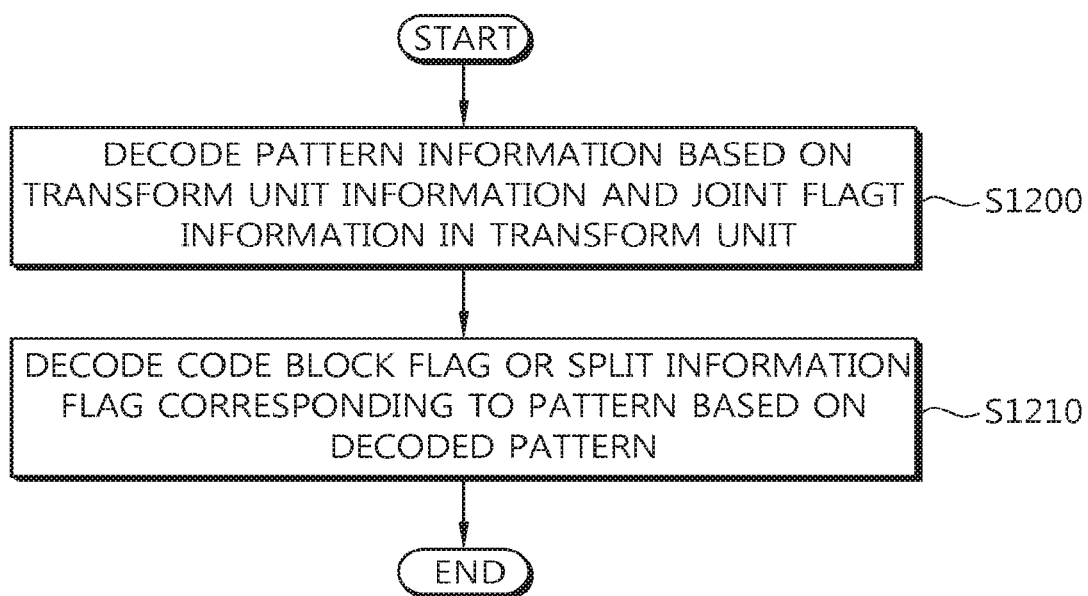
FIG. 12 is a flow chart showing a method for decoding transform unit information joint flag information, in accord with an illustrative example.

FIG. 12 is a flow chart showing a method for decoding transform unit information joint flag information according to another exemplary embodiment of the present invention.

Referring to FIG. 12, the pattern information is decoded based on the transform unit information joint flag information (S1200).

The code block flag or the split information flag information corresponding to the pattern are decoded based on the decoded pattern information (S1210).

That is, the pattern information is provided based on the above-mentioned Table 2 and the code block flag information and the split information flag information corresponding to the corresponding pattern information may be decoded.

While the present invention has been shown and described in connection with the embodiments, it will be apparent to those skilled in the art that modifications and variations can be made without departing from the spirit and scope of the invention as defined by the appended claims.

The invention claimed is:

1. A video decoding method comprising:
   decoding integrated code block flag information in a coding unit;
   decoding a split information flag based on the integrated code block flag information and size information in a first transform block; and
   decoding code block flag information in the first transform block in a case that the first transform block is not split into four second transform blocks based on the split information flag, wherein
   the split information flag is not decoded in a case that transform coefficients of the first transform block are not present,
   the first transform block is not split into the four second transform blocks in a case that a value of the split information flag is equal to a first predetermined value,
   the first transform block is split into the four second transform blocks in a case that the value of the split information flag is equal to a second predetermined value,
   the code block flag information in the first transform block is decoded without decoding the split information flag in a case that a size of the first transform block is equal to a predetermined size,
   the integrated code block flag is decoded in a case that a transform depth of the first transform block is 0, and
   flag information indicating whether a Luma component in the first transform block includes one or more transform coefficients other than 0 is decoded as the code block flag information in a case that the first transform block is not split.

2. The video decoding method of claim 1, wherein the integrated code block flag information is applied in only the predetermined transform depth in the first transform block.

3. The video decoding method of claim 1, wherein the integrated code block flag represents whether transform coefficients of luminance signal and chrominance signal are present.

4. The video decoding method of claim 1, further comprising:
   generating a reconstructed block using intra prediction for a prediction block in the coding unit and a reconstructed residual block for the first transform block.

5. The video decoding method of claim 4, wherein a size of the prediction block and the size of the first transform block are different.

6. The video decoding method of claim 1, further comprising:

generating a reconstructed block using inter prediction for a prediction block in the coding unit and a reconstructed residual block for the first transform block, wherein the intra prediction for the prediction block is performed using a merge mode or an advanced motion vector prediction mode.

7. A video encoding method comprising:

encoding integrated code block flag information in a coding unit;

encoding a split information flag based on the integrated code block flag information and size information of a first transform block; and encoding code block flag information of the first transform block in a case that the first transform block is not split into four second transform blocks based on the split information flag, wherein the split information flag is not encoded in a case that transform coefficients of the first transform block are not present, the first transform block is not split into the four second transform blocks in a case that a value of the split information flag is equal to a first predetermined value, the first transform block is split into the four second transform blocks in a case that the value of the split information flag is equal to a second predetermined value, the code block flag information of the first transform block is encoded without encoding the split information flag in a case that a size of the first transform block is equal to a predetermined size, the integrated code block flag is encoded in a case that a transform depth of the first transform block is 0, and flag information indicating whether a Luma component in the first transform block includes one or more transform coefficients other than 0 is encoded as the code block flag information in a case that the first transform block is not split.

8. The video encoding method of claim 7, wherein the integrated code block flag information is applied in only the predetermined transform depth in the first transform block.

9. A non-transitory computer readable medium storing a bitstream generated by the video encoding method of claim 7.

10. The video encoding method of claim 7, wherein the integrated code block flag represents whether transform coefficients of luminance signal and chrominance signal are present.

11. The video encoding method of claim 7, further comprising:

generating a reconstructed block using intra prediction for a prediction block in the coding unit and a reconstructed residual block for the first transform block.

12. The video encoding method of claim 11, wherein a size of the prediction block and the size of the first transform block are different.

13. The video encoding method of claim 7, further comprising:

generating a reconstructed block using inter prediction for a prediction block in the coding unit and a reconstructed residual block for the first transform block, wherein the intra prediction for the prediction block is performed using a merge mode or an advanced motion vector prediction mode.

14. A non-transitory computer readable medium storing a bitstream, the bitstream comprising:

integrated code block flag information of coding unit, wherein the bitstream includes a split information flag in a case that a value of the integrated code block flag is equal to a first predetermined value and a size of a first transform block corresponds to a predetermined range, code block flag information of the first transform block is present in the bitstream in a case that the first transform block is not split into four second transform blocks based on the split information flag, and the split information flag is not present in the bitstream in a case that transform coefficients of the first transform block are not present in the bitstream, the first transform block is not split into the four second transform blocks in a case that a value of the split information flag is equal to a second predetermined value, the first transform block is split into the four second transform blocks in a case that the value of the split information flag is equal to a third predetermined value, the code block flag information in the first transform block is present in the bitstream, and the split information flag is not present in the bitstream in a case that a size of the first transform block is equal to a predetermined size, the integrated code block flag is present in the bitstream in a case that a transform depth of the first transform block is 0, and flag information indicating whether a Luma component in the first transform block includes one or more transform coefficients other than 0 is present in the bitstream as the code block flag information in a case that the first transform block is not split.

15. The non-transitory computer readable medium of the claim 14, wherein the integrated code block flag information is applied in only the predetermined transform depth in the first transform block.

16. The non-transitory computer readable medium of claim 14, wherein the integrated code block flag represents whether transform coefficients of luminance signal and chrominance signal are present in the bitstream.

17. The non-transitory computer readable medium of claim 14, further comprising:

generating a reconstructed block using intra prediction for a prediction block in the coding unit and a reconstructed residual block for the first transform block.

18. The non-transitory computer readable medium of claim 17, wherein a size of the prediction block and the size of the first transform block are different.

19. The non-transitory computer readable medium of claim 14, further comprising:

generating a reconstructed block using inter prediction for a prediction block in the coding unit and a reconstructed residual block for the first transform block, wherein the intra prediction for the prediction block is performed using a merge mode or an advanced motion vector prediction mode.

* * * * *